United States Patent
Cole

(10) Patent No.: US 9,770,853 B2
(45) Date of Patent: Sep. 26, 2017

(54) APPARATUS AND METHOD FOR FORMING A DESIGN ON AN EXPANDED BEAD FOAM ARTICLE

(71) Applicant: SONOCO DEVELOPMENT, INC., Hartsville, SC (US)

(72) Inventor: Rob Cole, Davisburg, MI (US)

(73) Assignee: Sonoco Development, Inc., Hartsville, SC (US)

( * ) Notice: Subject to any disclaimer, the term of this patent is extended or adjusted under 35 U.S.C. 154(b) by 267 days.

(21) Appl. No.: 14/687,606

(22) Filed: Apr. 15, 2015

(65) Prior Publication Data

US 2015/0298370 A1    Oct. 22, 2015

Related U.S. Application Data

(60) Provisional application No. 61/981,437, filed on Apr. 18, 2014.

(51) Int. Cl.
*B29C 33/04*    (2006.01)
*B29C 44/34*    (2006.01)
*B29C 44/10*    (2006.01)
*B29C 44/58*    (2006.01)

(52) U.S. Cl.
CPC .......... *B29C 44/3426* (2013.01); *B29C 33/04* (2013.01); *B29C 33/048* (2013.01); *B29C 44/10* (2013.01); *B29C 44/343* (2013.01); *B29C 44/3434* (2013.01); *B29C 44/58* (2013.01)

(58) Field of Classification Search
CPC .............. B29C 44/3426; B29C 44/343; B29C 44/3434; B29C 33/04; B29C 33/048
USPC ..................................... 264/48, 119
See application file for complete search history.

(56) References Cited

U.S. PATENT DOCUMENTS

| | | | | |
|---|---|---|---|---|
| 2,699,097 A | * | 1/1955 | Binkley ................. | C04B 28/18 106/672 |
| 2,907,072 A | * | 10/1959 | Jodell ................... | B29C 44/445 264/52 |
| 3,417,170 A | * | 12/1968 | Knapp ................. | B29C 44/461 264/39 |
| 3,457,217 A | * | 7/1969 | Oxel .................... | B29C 44/206 264/45.3 |
| 3,941,528 A | * | 3/1976 | Cotterell ................ | B29C 33/10 249/141 |
| 4,275,539 A | * | 6/1981 | Abbott, III ............ | B28B 11/042 264/45.4 |
| 4,439,122 A | * | 3/1984 | Besse ................... | B29C 44/583 249/145 |
| 4,557,881 A | * | 12/1985 | Rabotski ................ | B29C 44/58 264/101 |
| 4,824,617 A | | 4/1989 | Takeuchi et al. | |
| 4,923,538 A | * | 5/1990 | Hill ........................ | B29C 44/04 156/245 |
| 5,198,163 A | * | 3/1993 | Yamamoto .......... | B29C 44/0446 264/321 |
| 5,505,886 A | * | 4/1996 | Baugh ................. | B29B 17/0026 264/102 |
| 8,419,406 B2 | | 4/2013 | Karlsson et al. | |
| 2006/0251881 A1 | * | 11/2006 | Gilder ....................... | C08J 9/33 428/317.1 |

(Continued)

*Primary Examiner* — Timothy Kennedy
(74) *Attorney, Agent, or Firm* — Miller, Matthias & Hull LLP

(57) ABSTRACT

An apparatus and method for forming a design on an expanded bead foam article such as an exercise roller is provided.

2 Claims, 4 Drawing Sheets

(56) References Cited

U.S. PATENT DOCUMENTS

| | | | |
|---|---|---|---|
| 2010/0092597 A1* | 4/2010 | Candiracci | B29C 44/3426 |
| | | | 425/4 C |
| 2010/0193985 A1* | 8/2010 | Umeda | B29C 33/3814 |
| | | | 264/51 |
| 2013/0175725 A1* | 7/2013 | Tokiwa | B29C 44/146 |
| | | | 264/45.4 |

* cited by examiner

APPARATUS AND METHOD FOR FORMING A DESIGN ON AN EXPANDED BEAD FOAM ARTICLE

BACKGROUND OF THE INVENTION

Field of the Invention

This invention patent relates to steam chest molding and the manufacture of expanded bead foam articles. More particularly, this invention relates to an apparatus and method for forming a design on an expanded bead foam article such as an exercise roller.

Description of the Related Art

Expanded foam bead molded articles, such as the popular cylindrical rollers used for exercise and therapy, may be produced in steam chest molding machines similar to injection molding machines. Exercise rollers can be any size suitable for exercising or therapy. Typical exercise rollers are about twelve to thirty-six inches long and have circular ends that are about six inches in diameter.

The exercise rollers are most often molded on the long (axial) dimension. That is, each tool die half is shaped like half of a cylinder, with the open/close direction of the mold being in the longitudinal (axial) direction.

Companies that sell exercise rollers often like to have their logos molded into one or both circular ends of the roller. However, because the circular ends of the mold are located in an opposite orientation to the open-close direction of the die tools, the logo typically doesn't reproduce in a crisp, well defined form because of the low foam pressure imposed on the ends. Logos can be added later as a secondary process, but this represents added cost. The present invention addresses these problems.

BRIEF SUMMARY OF THE INVENTION

The present invention is an apparatus and method for forming a design on an expanded bead foam article.

In one aspect of the invention, an apparatus for forming a design on an expanded bead foam article is provided. The apparatus may comprise a forming die having two opposing die halves, preferably attached along a hinge line, and at least one open end. The die defines a cavity and an axis parallel to the hinge line. The open end is orthogonal to the axis, that is, to the open and close orientation of the die halves. A steam source supplies steam to the die. The apparatus further comprises a design forming plate defining a contour in the shape of a design. The design forming plate is configured to fit within the open end and is moveable in an axial direction so that it can apply axial pressure on the expanded bead foam article to form a highly legible design.

In another aspect of the invention, a method for forming a design on an expanded bead foam article is provided. The method may comprise the steps of:

Step 1: Providing a steam molding device comprising two opposing dies with one open end, the opposing dies defining a cavity having a longitudinal axis, and a circular end die plate oriented orthogonally to the axis. The end die plate is reciprocally moveable independently of the dies in an axial direction from an outward position outside the die cavity to an inward position inside the die cavity. The end die plate has a design contour as part of or mounted to its cavity facing side.

Step 2: Filling the cavity with expanded foamed beads while the end die plate is in the outward position.

Step 3: Bonding the expanded foam beads together under pressure by introducing pressurized steam into the molding device.

Step 4: Forming a design into an endwall of the molded article by moving the end die plate inward (toward the foam beads) to increase the axial pressure on the expanded foam beads at the end endwall.

Step 5: Cooling the expanded foam beads in the cavity (for about two minutes), thereby producing a molded article having a design formed in an endwall.

Step 6: Retracting the end die plate outward (away from the molded article).

Step 7: Ejecting the molded article from the molding device.

Preferably the opposing dies are half-cylindrical. The numbering of the steps does not mean that they must be done in sequentially numerical order. For example, Steps 3 and 4 may be done simultaneously. Preferably, before or during Step 4 (the design forming step), the end die is heated.

DETAILED DESCRIPTION OF THE INVENTION

Figure 1:
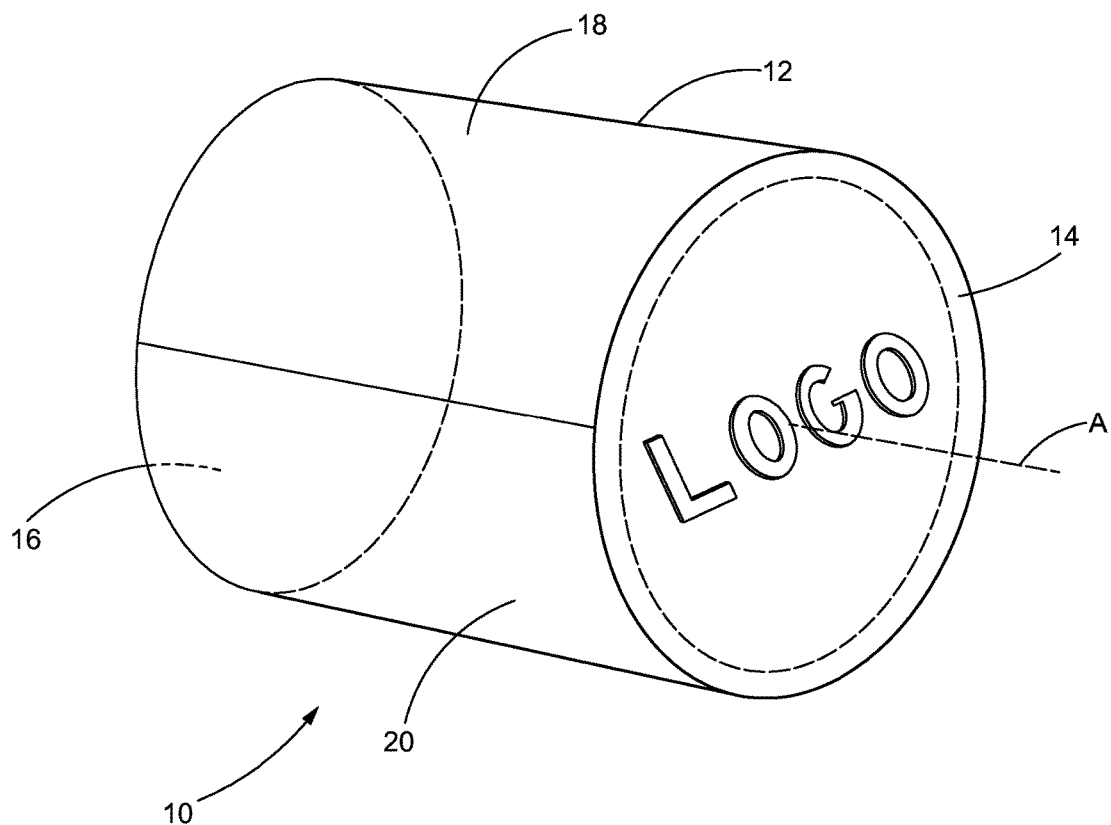
FIG. 1 is a perspective view of an expanded bead foam article.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

FIG. 1 is a perspective view of an expanded bead foam article 10 as might be produced using a steam chest mold. The article 10 comprises a sidewall 12, a first endwall 14 and an opposing second endwall 16. The sidewall 12 is cylindrical and the endwalls 14, 16 are circular. The article 10 is longitudinal and may define an axis A extending from endwall to endwall.

The sidewall 12 in turn may comprise an upper sidewall 18 and a lower sidewall 20 delineated from each other by a seam 22. The seam 22 is a vestige of the steam chest molding process, in which an upper die half 40 forms the upper sidewall 18 and the upper half of each endwall 14, 16 and a lower die half 38 forms the lower sidewall 20 and the lower half of each endwall 14, 16. A design 24 is formed in the first endwall 14 as will now be explained with respect to FIG. 2.

Figure 2:
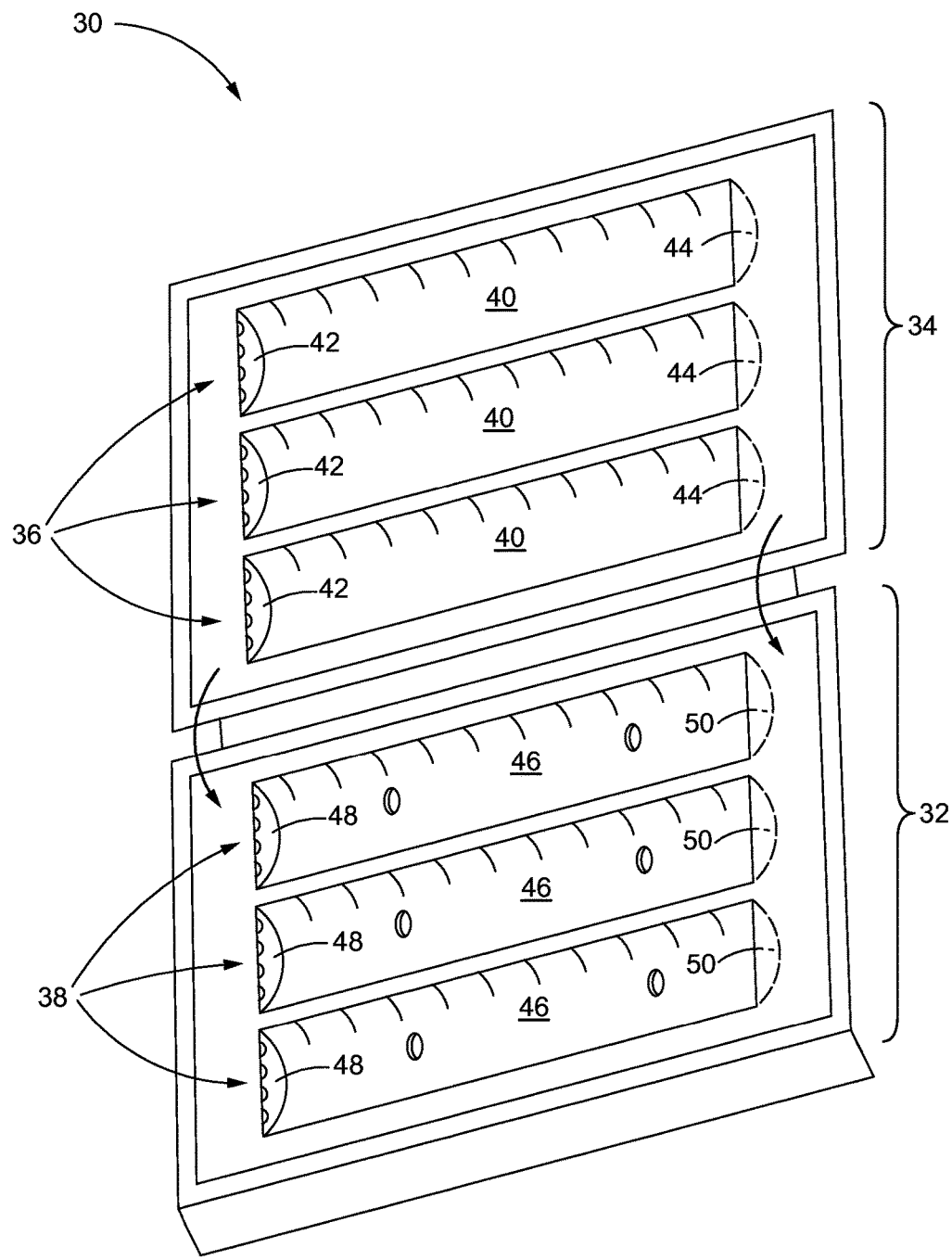
FIG. 2 is a perspective view of a conventional molding apparatus for forming an expanded bead foam article.

FIG. 2 is a perspective view of a conventional steam chest molding apparatus 30 for forming expanded bead foam articles such as the article 10 of FIG. 1. The illustrated steam chest molding apparatus 30 includes a first set 32 of three upper die halves 36 and a second set 34 of three lower die halves 38. The upper and lower die halves 36, 38 are arranged in complimentary opposing fashion so that each pair of opposing upper and lower die halves 36, 38 forms a single molded article 10. Three pairs of upper and lower die halves 36, 38 can form three molded articles 10 simultaneously.

Each die half 36, 38 is shaped like half of a cylinder, including a sidewall terminating at an endwall at each end. For example, each upper die half 36 comprises an upper sidewall half 40, an upper first endwall half 42 and an upper second endwall half 44. Similarly, each lower die half 38 comprises a lower sidewall half 46, a lower first endwall half 48 and a lower second endwall half 50. The upper sidewall half 40 and the lower sidewall half 46 form the sidewall 12 of the article 10. The upper first endwall half 42 and the lower first endwall half 46 form the first endwall 14 of the article 10, including the design 24.

Figure 3:
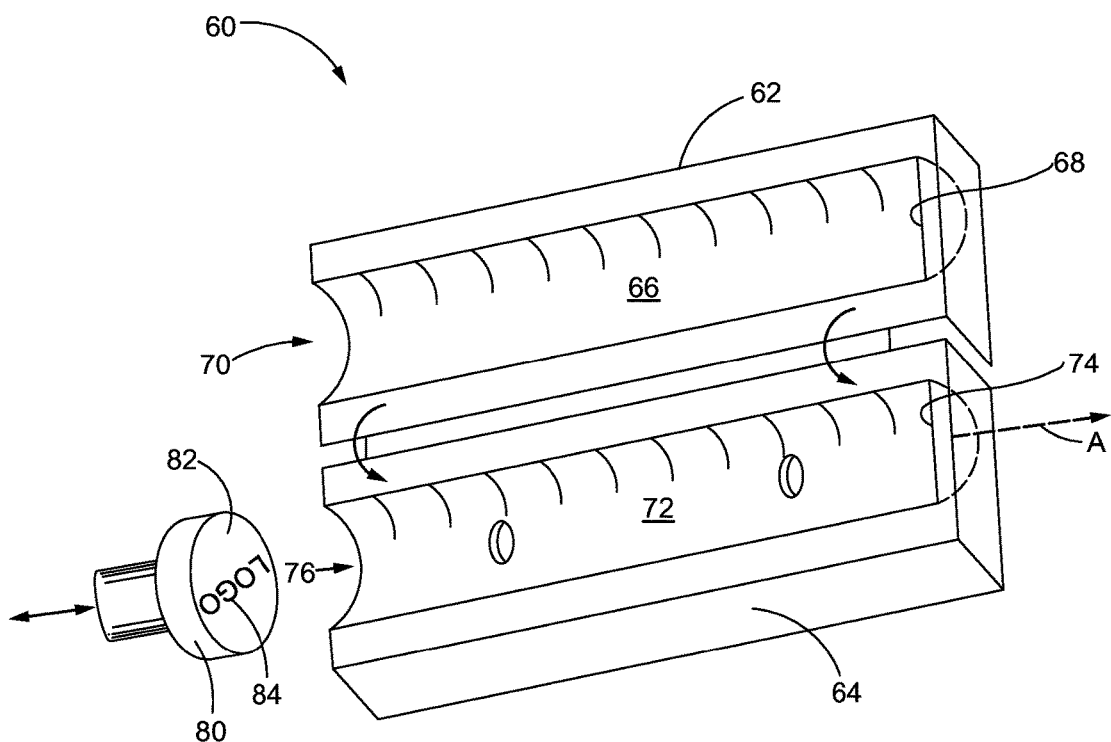
FIG. 3 is a perspective view of an apparatus for forming a design on an expanded bead foam article according to the disclosure.

Referring again to FIG. 1, because the molding apparatus 30 is divided along the longitudinal (axial) direction of the article 10, the seam 22 in FIG. 1 runs in the longitudinal (axial) direction. More importantly for the purposes of this disclosure, because the upper endwall halves 42, 44 and the lower endwall halves 48, 50 are oriented orthogonally to the longitudinal axis of the cavities (as well as the open-close direction of the upper and lower die halves 36, 38), the endwall halves 42, 48, 48, 50 are subjected to a relatively low foam pressure, and thus a logo formed by, say, the upper first endwall half 42 and the lower first endwall half 48 typically doesn't reproduce in a crisp, well defined form. FIG. 3 is a perspective view of an apparatus 60 for forming a design on an expanded bead foam article according to the invention. The apparatus 60 may be a steam chest molding die tool set comprising two opposing dies designated as the upper die half 62 and the lower die half 64, each preferably shaped substantially like half of a cylinder, but with at least one end lacking an end wall. For example and without limitation, in the embodiment illustrated in FIG. 3, the upper die half 62 comprises an upper sidewall half 66 and an upper first endwall half 68. The opposing end of the upper die half 62 defines an upper semicircular opening 70. Likewise, the lower die half 64 comprises a lower sidewall half 72 and a lower first endwall half 74. The opposing end of the lower die half 62 defines a lower semicircular opening 76.

The upper sidewall half 62 and the lower sidewall half 64 form the sidewall 12 of the molded article 10. The upper first endwall half 68 and the lower first endwall half 74 may form an endwall 16 of the article 10. The upper semicircular opening 70 and the lower semicircular opening 76 are configured to receive a moveable end die plate 80 when the upper and lower die halves 62, 64 are brought together. When the opposing die halves are brought together they define a cavity having a cylindrical sidewall and one end wall.

The end die plate 80 preferably has a circular cross-section and comprises a cavity facing surface 82. The cavity facing surface 82 is contoured as indicated at 84 in order to form the design 24 in an endwall of the molded article 10 as explained below.

The end die plate 80 can move parallel to the longitudinal axis A defined by the opposing half-cylindrical dies 62, 64, i.e., in the longitudinal (axial) direction, so as to create additional pressure on the end 16 of the molded foam article 10. In this way, the design 84 which is part of or mounted on the end die plate 80 creates a crisp, highly legible design 24 onto the foamed article 10 due to the positive pressure created by the moving end die plate 80.

The logo bearing end die plate 80 can be heated so that, as it moves into the foam, both the mechanical pressure from the inward movement of the end die plate 80 and the melting of the foam particles during the steam molding process improves the quality of the design 24 compared to a conventional process.

Figure 4:
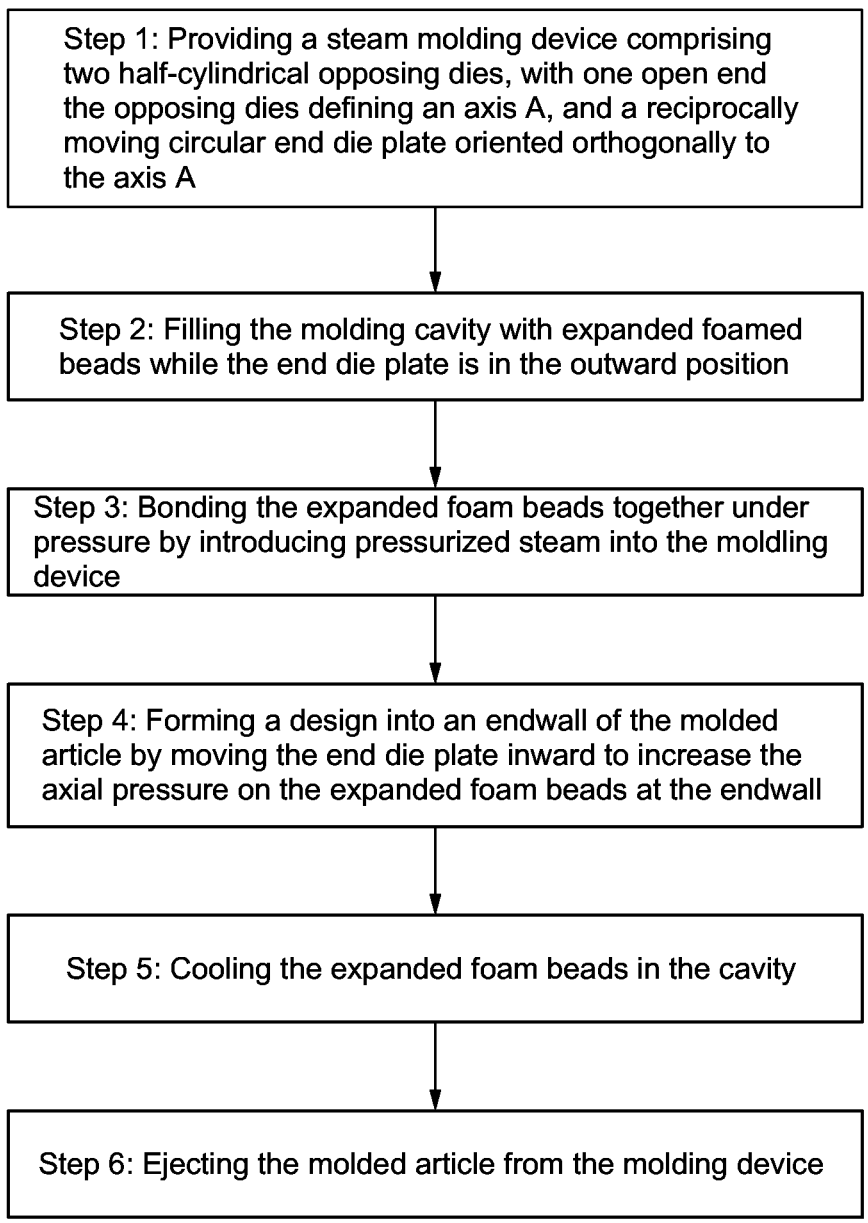
FIG. 4 is a flow chart showing a method for forming a design on an expanded bead foam article according to the disclosure.

FIG. 4 is a flow chart showing a method for forming a design 24 on an expanded bead foam article 10 according to the invention. The method may comprise the following steps:

Step 1: Providing a steam molding apparatus 60 comprising a pair of half-cylindrical opposing die halves 62, 64, each die half 62, 64 having at least one open end. Where the die halves 62, 64 have only one open end, each die half 62, 64 has a closed end. For example, in the illustrated embodiment the upper die half 62 has an upper semicircular opening 70 and a semicircular upper endwall half 68, and the lower die half 64 has a lower semicircular opening 76 and a semicircular lower endwall half 74.

The opposing die halves 62, 64 may be rotatably fixed to each by one or more hinges 86. The hinges 86 may define a hinge line H. The opposing die halves 62, 64 may be brought together by rotating one or both along the hinge line H. When brought together, the opposing die halves 62, 64 will define a cavity having a longitudinal axis A parallel to the hinge line H, and the opposing endwall halves 68, 74 will form a circular endwall.

The end die plate 80 is oriented orthogonally to the longitudinal axis A. That is, the cavity facing (design bearing) surface 82 defines a plane that is substantially perpendicular to the longitudinal axis A. The end die plate 80 is reciprocally moveable in the axial direction from an outward position to an inward position independently of the half-cylindrical dies 62, 64. The end die plate 80 has a design contour 84 as part of or mounted on its cavity facing surface 82.

Step 2: Filling the cavity with expanded foamed beads while the end die plate 80 is in the outward position.

Step 3: Bonding the expanded foam beads together under pressure by introducing pressurized steam into the apparatus 60.

Step 4: Forming a design 24 into an endwall 14 of the molded article 10 by moving the end die plate 80 inward (toward the foam beads) to increase the axial pressure on the expanded foam beads at the end endwall 14. Preferably the end die plate 80 in moved inward a sufficient distance and held in place a sufficiently long time until the end die plate 80 applies pressure on the foamed article endwall 14 sufficient to form a clear design on the endwall 14.

Step 5: Cooling the expanded foam beads in the cavity (for about two minutes), thereby producing a molded article 10 having a design 24 formed in an endwall 16.

Step 6: Retracting the end die plate 80 outward (away from the molded article 10).

Step 7: Ejecting the molded article 10 from the apparatus 60.

Preferably, before or during the design forming step 4, the end die plate 80 is heated, either electrically or with direct or indirect steaming. The design forming step 4 may last about 20 seconds or more.

The apparatus and method can be used with any suitable expanded foam beads, but preferably is more suitable for expanded polyethylene beads and expanded polypropylene beads.

Although the apparatus 60 is shown having only one pair of opposing die halves 62, 64, it should be understood that the number of opposing die halves can be more than one. It also should be understood that the opposing die halves 62, 64 need not be the same shape, and that the cavities defined by opposing die halves 62, 64 need not have the same volume. For example and without limitation, For example, although the apparatus 60 described above, and thus the molded article 10, has a circular cross section, other cross sectional shapes are contemplated, such as but not limited to oval and rectangular.

Although the invention has been heretofore described as an apparatus and method for forming a design 24 on one endwall 14 of a foamed article 10, the invention is also useful in forming a design on both endwalls 14, 16 by using a second end die plate carrying a second design contour. The second die plate also moves axially and is mounted in opposing relationship to the first end die plate 80 in order to form a design on the opposite endwall 16. The upper and lower die plates 62, 64 would, of course, lack the semicircular endwalls 68, 74 shown in FIG. 3.

Although the invention has been described as an apparatus and method for forming a design on one endwall of a cylindrically shaped foamed article, the invention may be useful in forming a design on foamed articles of other shapes.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A method of molding a design into a foam article comprising the steps of:

Step 1: Providing a steam molding apparatus comprising two half-cylindrical opposing dies with one open end, the opposing dies defining an axis A, and a circular end die plate oriented orthogonally to the axis A, the two half-cylindrical dies and the end die plate defining a cavity, the end die plate being reciprocally moveable in an axial direction from an outward position to an inward position independently of the half-cylindrical dies, the end die plate having a design contour as part of or mounted on its cavity facing side;

Step 2: Filling the cavity with expanded foamed beads while the end die plate is in the outward position;

Step 3: Bonding the expanded foam beads together under pressure by introducing pressurized steam into the steam molding apparatus;

Step 4: Forming a design into an endwall of the molded article by moving the end die plate inward (toward the foam beads) to increase the axial pressure on the expanded foam beads at the end endwall;

Step 5: Cooling the expanded foam beads in the cavity, thereby producing a molded article having a design formed in an endwall;

Step 6: Retracting the end die plate outward (away from the molded article); and Step 7: Ejecting the molded article from the steam molding apparatus.

2. The method of claim 1 wherein:

before or during the design forming step 4, the end die plate is heated.

* * * * *